(12) United States Patent
Kaltenbacher et al.

(10) Patent No.: US 6,552,126 B2
(45) Date of Patent: Apr. 22, 2003

(54) GOLF BALL COVER CONTAINING A BLEND OF IONOMER AND PLASTOMER, AND METHOD OF MAKING SAME

(75) Inventors: Edward J. Kaltenbacher, Humble, TX (US); Joseph Domine, Humble, TX (US); Michael J. Sullivan, Barrington, RI (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/785,617

(22) Filed: Feb. 16, 2001

(65) Prior Publication Data

US 2001/0005698 A1 Jun. 28, 2001

Related U.S. Application Data

(63) Continuation-in-part of application No. 08/811,447, filed on Mar. 3, 1997, now abandoned.

(51) Int. Cl.$^7$ .............................................. A63G 37/12
(52) U.S. Cl. ........................... 525/93; 525/72; 525/221; 473/379; 473/385
(58) Field of Search ........................... 525/72, 93, 221; 473/378, 385

(56) References Cited

U.S. PATENT DOCUMENTS

| | | |
|---|---|---|
| 2,741,480 A | 4/1956 | Smith |
| 2,924,593 A | 2/1960 | Breslow |
| 3,384,612 A | 5/1968 | Brandt et al. |
| 3,421,766 A | 1/1969 | Chmiel |
| 3,454,676 A | 7/1969 | Busse |
| 3,491,073 A | 1/1970 | Marinak |
| 3,645,992 A | 2/1972 | Elston |
| 4,205,021 A | 5/1980 | Morita et al. ................ 525/240 |
| 4,274,637 A | 6/1981 | Molitor |
| 4,405,774 A | 9/1983 | Miwa et al. |
| 4,409,366 A | 10/1983 | Schmelzer |
| 4,510,303 A | 4/1985 | Oda et al. |
| 4,530,914 A | 7/1985 | Ewen et al. |
| 4,567,219 A | 1/1986 | Tominaga et al. |
| 4,668,752 A | 5/1987 | Tominari et al. ......... 526/348.2 |
| 4,808,561 A | 2/1989 | Welborn, Jr. ................ 502/104 |
| 4,858,924 A | 8/1989 | Saito et al. |
| 4,861,028 A | 8/1989 | Williams |
| 4,935,474 A | 6/1990 | Ewen et al. |
| 4,937,299 A | 6/1990 | Ewen et al. |
| 4,987,212 A | 1/1991 | Morterol et al. |
| 5,019,320 A | 5/1991 | Hasegawa et al. |
| 5,026,798 A | 6/1991 | Canich ........................ 526/127 |

(List continued on next page.)

FOREIGN PATENT DOCUMENTS

| | | |
|---|---|---|
| DE | 26 08 863 A1 | 9/1977 |
| DE | 3835044 A1 | 4/1990 |
| EP | 0 210 615 A2 | 2/1987 |
| EP | 0 351 392 A2 | 1/1990 |

OTHER PUBLICATIONS

Encyclopedia of Polymer Science and Engineering vol. 5 pp. 416–429, Jun. 1987.*
"Environmentally Friendly Films", EXXON Chem. Co., 1993.
"Products from EXXPOL™ Technology", EXXON Chem. Co., (47 pp.), 1992–1995.
"Polyolefin Modification with EXACT™ Plastomers", EXXON Chem. Co.
EXACT™ 4049, EXXON Chem. Co., Oct. 1994.
"EXACT FACTS™", EXXON Chem, Clo., Jun. 1994.
"ENGAGE Polyolefin Elastomers", DOW Plastics, DOW Chem. Co. (1994).
EXACT™ Plastomers, Fact Sheet—Highly Gas Permeable Films, EXXON Chem. Co.
"A New Family of Linear Ethylene Polymers", EXXON Chem. Co., 1993.
"Here's the Latest Score on Single–Site Catalysts", Plastics World, Apr. 1996.
"A New Family of Linear Ethylene Polymers with Enhanced Sealing Performane", EXXON Chem. Co.
EXXPOL™ Technology—Single Site Catalyzed Polymerization Technology, EXXON Chem. Co.
ENGAGE Polyolefin Elastomers, Dow Plastics.
"A New Family of Resins", Converting Magazine Sep. 1993 and Oct. 1993.
"Competition for Metallocenes Could Turn Ugly", Plastics World, Jan. 1995.
"Selected Applications for Constrained Geometry Catalyst Technology (CGCT) Polymers", G.D. Schwank, Dow Chemical, U.S.A., Sep. 23, 1992.
EXACT™ Plastomers, Targeted Performance for Extrusion, Molding and Polymer Modification, EXXON Chem. Co., 1994.
"Performance of Ethylene/1–Octane, Ethylene/1–Pentene and Ethylene/1–Butene Elastomers Made Using INSITE™ Technology in Peroxide–Cured Durable Formulations", Dow Chem. Co., Oct. 1995.
"New Hydrocarbon Elastomers via Constrained Geometry Catalyst Technology", Dow Chem. Co., Oct. 1995.
"Evaluation of EPDM Materials as Produced by Constraine Geometry Catalyst Chemistry AGainst Current Commercial EPDM Products and Performance Requirements", DuPont Elastomers, Oct. 1995.
"FLEXOMER™ Polyolefins: A Bridge Between Polyethylene and Rubbers", Union Carbide Chemicals and Plastics Inc., 1990.

Primary Examiner—David J. Buttner

(57) ABSTRACT

Disclosed herein is a golf ball having a core and a cover comprising a blend of ionomer and plastomer. The golf ball has an impact resistance and cut resistance comparable to a ball having a non-plastomer cover and containing higher quantities of ionomer.

24 Claims, No Drawings

U.S. PATENT DOCUMENTS

| | | |
|---|---|---|
| 5,055,438 A | 10/1991 | Canich ...................... 502/117 |
| 5,064,802 A | 11/1991 | Stevens et al. |
| 5,084,540 A | 1/1992 | Albizzati et al. ........ 526/348.6 |
| 5,123,659 A | 6/1992 | Williams |
| 5,244,969 A | 9/1993 | Yamada |
| 5,246,783 A | 9/1993 | Spenadel et al. ........... 428/461 |
| 5,272,016 A | 12/1993 | Ralph |
| 5,272,236 A | 12/1993 | Lai et al. ................. 526/348.5 |
| 5,278,272 A | 1/1994 | Lai et al. ................. 526/348.5 |
| 5,324,800 A | 6/1994 | Welborn, Jr. et al. |
| 5,338,610 A | 8/1994 | Sullivan |
| 5,407,998 A | 4/1995 | Horiuchi et al. |
| 5,415,905 A | 5/1995 | Middlesworth et al. |
| 5,490,673 A * | 2/1996 | Hiraoka |
| 5,703,166 A * | 12/1997 | Rajagopalan |
| 6,013,734 A * | 1/2000 | Berta |

* cited by examiner

GOLF BALL COVER CONTAINING A BLEND OF IONOMER AND PLASTOMER, AND METHOD OF MAKING SAME

CROSS REFERENCES TO RELATED APPLICATIONS

This application is a continuation-in-part application of U.S. Application Ser. No. 08/811,447 filed Mar. 3, 1997 now abandoned.

FIELD OF THE INVENTION

The present invention relates generally to golf balls, and more particularly to golf balls having covers containing blends of ionomer and plastomer.

BACKGROUND OF THE INVENTION

Traditional golf ball covers were comprised of balata or blends of balata with elastomeric or plastic materials. Balata covered balls provide an experienced golfer with the ability to apply a spin to control the ball in flight. Moreover, the soft balata covers produce a soft 'feel" to the low handicap player. However, despite the benefits of balata, balata-covered golf balls are easily cut and/or damaged if mis-hit; thus, balata and its synthetic substitutes, trans-polybutadiene and trans-polyisoprene have been essentially replaced by covers made of ionomers.

Ionomers are partial metal salts of acid containing polymers, such as ethylene based polymers. These include the partial metal salts of copolymers of ethylene and an ethylene-copolymerizable unsaturated carboxylic acid, such as acrylic acid, methacrylic acid, or maleic acid. Metal ions, such as sodium, zinc, lithium, magnesium, and the like are used to neutralize a portion of the acidic group in the copolymer resulting in a thermoplastically reversible crosslinked polymer exhibiting enhanced properties, i.e. durability, etc., for golf ball cover construction as compared to balata-covered balls.

Several attempts have been made to match or improve the performance of an ionomer golf ball by adding non-ionic and non-ionizable polymers thereto. For example, U.S. Pat. No. 4,567,219 is directed to a cover composition for golf balls with improved impact resistance. The cover comprises a blend of ionomer resin and 1–15 parts by weight of a linear, low-density polyethylene per 100 parts by weight of the ionomer resin. U.S. Pat. No. 5,019,320 discloses a golf ball composition comprising an ionomer resin and a low molecular weight polyethylene wax. This blend also is alleged to provide improved impact resistance. The polyethylene wax is present in a quantity of 0.1 to 6 parts by weight based upon 100 parts by weight of ionomer resin. It would be useful to develop a golf ball cover containing a blend of an ionomer and a non-ionic or non-ionizable polymer in which substantial quantities of the non-ionic and/or non-ionizable polymers can be used while achieving playability properties comparable to those which are obtained using known ionomeric golf ball cover materials.

SUMMARY OF THE INVENTION

An object of the invention is to provide a golf ball having the playability properties of an ionomeric covered ball while containing reduced quantities of ionomer.

Another object of the invention is to provide a golf ball having a durable cover.

Yet another object of the invention is to provide a golf ball which can be produced in an efficient and economical manner.

A further object of the invention is to provide a method for making a golf ball having the characteristics described above.

Other objects will be in part obvious and in part pointed out more in detail hereafter.

The invention in a preferred form is a golf ball having a core and one or more cover layers, wherein the cover layer contains a blend of ionomer and plastomer. The plastomer is comprised of catalytically polymerized, random copolymers of ethylene and one or more olefin comonomers characterized by a narrow or controlled composition distribution. The plastomer preferably has a dispersion index ($M_W/M_M$), i.e. the ratio of weight average molecular weight to number average molecular weight, of about 1.5 to 4. The olefin comonomer or comonomers are present in amounts of about 10–35 wt % based upon the overall weight of the plastomer.

In a particularly preferred form of the invention, the cover layer contains 10–90, and preferably 20–60, parts of plastomer based upon 100 parts by weight of ionomer. The golf ball has a cut resistance of at least 3 and a Shore D hardness in the range of 40–80.

Another preferred form of the invention is a method of making a golf ball comprising the steps of (1) obtaining a core and (2) forming a cover over the core, the cover comprising a blend of ionomer and plastomer.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

The golf balls of the invention have covers which comprise blends of ionomers, thermoplastic elastomers, and non-ionic and/or non-ionizable olefin copolymers which have a uniform, narrow molecular weight, a high comonomer content, and an even distribution of plastomer. The dispersion index of the plastomers generally is about 1.5–4, preferably 1.5–3.5 and more preferably 1.5–2.4. The density is typically in the range of 0.85–0.93 g/cc it unfoamed and 0.10–0.90 g/cc if foamed. The comonomer content typically is in the range of 10–35%, and preferably 15–30%. The melt index (MI) of the plastomer generally is less than 30 with the lower molt index materials providing blends with better low temperature impact. Accordingly a melt index less than about 20 is typical with a melt index of less than 10 being preferred and one of less than 5 being most preferred. The composition distribution breadth index generally is greater than 30%, preferably is at least 45%, and more preferably is at least 50%. Preferably the golf balls also include a curing agent for the plastomer.

The term "copolymer" includes olefin copolymers made from ethylene and one or other olefin monomers. Examples of olefin monomers include propylene, 1-butene, 1-hexene, 1-octene, 4-methyl pentene-1,1,4-hexadiene, norbornene, norbornadiene, vinyl norbornene, ethylidene norbornene, etc. The compositions of the invention further may include additives and fillers as well as a co-agent that can react with the curing agent to aid in crosslinking the plastomer and/or ionomer or to improve processability. Co-agents which have been used for that purpose include triallyl cyanurates, ethylene glycol di(meth)acrylate, tri(meth)acrylates, divinyl benzene and other multifunctional chemicals.

The "composition distribution breadth index" (CDBI) is defined as the weight percent of the plastomer molecules which have a comonomer content between 50 percent and 125 percent of the median comonomer content (on a mole basis) of the sample. For example the CDBI of a sample which had a butene content of 8 mole percent would be the weight percent of the molecules which had butene contents between 6 and 10 mole percent.

The plastomers employed are polyolefin copolymers developed using metallocene single-site catalyst technology. Polyethylene plastomers generally have better impact resistance than polyethylenes made with Ziegler-Natta catalysts. Plastomers exhibit both thermoplastic and elastomeric characteristics. In addition to being comprised of a polyolefin such as ethylene, plastomers contain up to about 35 wt % comonomer. Plastomers include but are not limited to ethylene-butene copolymers, ethylene-octene copolymers, ethylene-hexene copolymers, and ethylene-hexene-butene terpolymers, as well as mixtures thereof.

The golf ball covers of the invention contain a blend of plastomer and ionomer in a ratio of 10:90 to 90:10, and more preferably 20:80 to 50:50. The golf ball covers may also include a thermoplastic elastomer such as available from Shell Chemical Company under the designation Kraton®. It has been found that the golf ball cover properties of high impact resistance, good durability and playability are particularly favorable when the ratio of plastomer;ionomer is in the range of 10:90 to 50:50. Other additives such as coloring agents, optical brighteners, processing aids and fillers typically are added in an amount of up to about 10 parts by weight based upon 100 parts by weight of the plastomer-ionomer blend.

The plastomers employed in the invention preferably are formed by a single site metallocene catalyst such as those disclosed in EP 29368, U.S. Pat. Nos. 4,752,597, 4,808,561, and 4,937,299, the teachings of which are incorporated herein by reference. Blends of plastomers can be used. As is known in the art, plastomers can be produced by solution, slurry and gas phase accesses but the preferred materials are produced by metallocene catalysis using a high pressure process by polymerizing ethylene in combination with other olefin monomers, such as butene-1, hexene-1, octene-1 and 4-methyl-1-pentene in the presence of catalyst system comprising a cyclopentadienyl-transition metal compound and an alumoxane.

Plastomers found especially useful in the invention are those sold by Exxon Chemical under the trademark "EXACT" and include linear ethylene-butene copolymers such as EXACT 3024 having a density of about 0.905 g/cc (ASTM D-1505) and a melt index of about 4.5 g/10 min. (ASTM D-2839); EXACT 3025 having a density of about 0.910 g/cc (ASTM D-1505) and a melt index of about 1.2 g/10 min. (ASTM D-2839); EXACT 3027 having a density of about 0.900 g/cc (ASTM D-1505) and a melt index of about 3.5 g/10 min. (ASTM D-2839). Other useful plastomers include but are not limited to ethylene-hexene copolymers such as EXACT 3031 having a density of about 0.900 g/cc (ASTM D-1505) and a melt index of about 3.5 g/10 min. (ASTM D-2839) , as well as EXACT 4049, which is an ethylene-butene copolymer having a density of about 0.873 g/cc (ASTM D-1505) and a melt index of about 4.5 g/10 min. (ASTM D-2839). All of the above EXACT series plastomers are available from EXXON Chemical Co.

EXACT plastomers typically have a dispersion index ($M_w/M_n$ where $M_w$ is weight average molecular weight and $M_n$ is number average molecular weight) of about 1.5 to 4.0, preferably 1.5–2.4, a density of about 0.86 to about 0.93 g/cc, preferably about 0.87 g/cc to about 0.91 g/cc, a melting point of about 140–220° F., and a melt index (MI) above about 0.5 g/10 mins, preferably about 1–10 g/10 mins as determined by ASTM D-1238, condition E. Plastomers which may be employed in the invention include copolymers of ethylene and at least one $C_3$–$C_{20}$ α-olefin, preferably a $C_4$–$C_8$ α-olefin present in an amount of about 5 to about 32 wt %, preferably about 7 to about 22 wt %, more preferably about 9–18 wt %. These plastomers are believed to have a composition distribution breadth index of about 45% or more.

Plastomers such as those sold by Dow Chemical Co. under the trade name ENGAGE also may be employed in the invention. These plastomers are believed to be produced in accordance with U.S. Pat. No. 5,272,236, the teachings of which are incorporated herein by reference. These plastomers are substantially linear polymers having a density of about 0.85 g/cc to about 0.93 g/cc measured in accordance with ASTM D-792, a melt index (MI) of less than 30 g/10 minutes, a melt flow ratio ($I_{10}/I_2$) of about 7 to about 20, where $I_{10}$ is measured in accordance with ASTM D-1238 (190/10) and $I_2$ is measured in accordance with ASTM D-1238 (190/2.16), and a dispersion index $M_w/M_n$ which preferably is less than 5, and more preferably is less than about 3.5 and most preferably is from about 1.5 to about 2.5. These plastomers include homopolymers of $C_2$–$C_{20}$ olefins such as ethylene, propylene, 4-methyl-1-pentene, and the like, or they can be interpolymers of ethylene with at least one $C_3$–$C_{20}$ α-olefin and/or $C_2$–$C_{20}$ acetylenically unsaturated monomer and/or $C_4$–$C_{18}$ diolefins. These plastomers have a polymer backbone that is either unsubstituted or substituted with up to 3 long chain branches/1000 carbons. As used herein, long chain branching means a chain length of at least about 6 carbons, above which the length cannot be distinguished using $^{13}C$ nuclear magnetic resonance spectroscopy. The preferred ENGAGE plastomers are characterized by a saturated ethylene-octene backbone and a narrow dispersion index $M_w/M_n$ of about 2.

These plastomers also are compatible with many conventional plasticizers and fillers. The fillers include, but are not limited to, clay, talc, asbestos, graphite, glass, mica, calcium metasilicate, barium sulfate, zinc sulfide, aluminum hydroxide, silicates, diatomaceous earth, carbonates such as calcium carbonate, magnesium carbonate and the like, metals such as titanium, tungsten, aluminum, bismuth, nickel, molybdenum, iron, copper, brass, boron, bronze, cobalt and beryllium, and alloys of the above metals, metal oxides such as zinc oxide, iron oxide, aluminum oxide, titanium oxide, magnesium oxide, zirconium oxide and the like, particulate synthetic plastic such as high molecular weight polyethylene, polystyrene, polyethylene ionomer resins and the like, particulate carbonaceous materials such as carbon black, natural bitumen and the like, as well as cotton flock, cellulose flock, and leather fiber. Dark colored fillers generally are not preferred for use at the outer surface of the ball if a white ball is desired. Thus, a two-layer cover in which a non-white filler is only present in the inner cover layer can be employed. The amount of filler employed is primarily a function of weight restrictions. For example, weight may be removed from the core and placed in the inner and/or outer cover. This added weight will change the moment of inertia of the ball thereby potentially altering performance. Various commercially available plastomers may be useful in the invention, including those manufactured by Mitsui.

The dispersion index $M_w/M_n$ of plastomers made in accordance with U.S. Pat. No. 5,272,236 most preferably is about 2.0. Non-limiting examples of these plastomers include ENGAGE CL 8001 having a density of about 0.868 g/cc, a melt index of about 0.5 g/10 mins, and a Shore A hardness of about 75; ENGAGE CL 8002 having a density of about 0.87 g/cc, a melt index of about 1 gms/10 min, Shore A hardness of about 75; ENGAGE CL 8003 having a density of about 0.885 g/cc, melt index of about 1.0 gms/10 min, and a Shore A hardness of about 86; ENGAGE EG 8100 having a density of about 0.87 g/cc, a melt index of about 1 gms/10 min., and a Shore A hardness of about 87; ENGAGE 8150 having a density of about 0.868 g/cc, a melt index of about 0.5 gms/10 min, and a Shore A hardness of about 75; ENGAGE 8200 having a density of about 0.87 g/cc, a melt index of about 5 g/10 min., and a Shore A hardness of about 75; and ENGAGE EP 8500 having a density of about 0.87 gms/cc, a melt index of about 5 g/10 min., and a Shore A hardness of about 75.

The ionomers which are blended with plastomer preferably are various commercially available ionomers sold under the trade name Iotek, such as Iotek 8000, Iotek 8020, Iotek 8030 or Iotek 7000, Iotek 7010, Iotek 7020 or Iotek 7030. Blends of ionomers can be used, however hard ionomers are preferred.

Coloring pigments and optical brighteners also may be included in the compositions of the invention. Useful coloring pigments include, for example, titanium dioxide, the presence of which simplifies the surface painting operation of the finished ball. In some cases, coloring pigments eliminate the need for painting, such as, for example, where the ball is intended for use on driving ranges.

The golf balls of the invention have a coefficient of restitution of at least 0.650, and more preferably at least 0.700, a PGA compression of about 60–110 and preferably 80–90, a ball size of 1.68"-1.75", and a ball weight of 45.93 grams or less.

To form a golf ball according to the invention, a solid, liquid or wound golf ball center is obtained. The center optionally may be covered with one or more non-plastomer inner cover layers prior to application of the plastomer cover layer or layers. If necessary, the center can be surface treated to facilitate adhesion thereof to a cover composition. Surface treatment can be performed by techniques known in the art, such as corona discharge, ozone treatment, sand blasting, grinding and the like. Non-limiting examples of useful non-plastomer cover compositions include blends of ethylene-acrylic acid or ethylene-methacrylic acid, as well as copolymers neutralized with mono-or divalent metals such as sodium, potassium, lithium, calcium, zinc or magnesium. Such compositions are shown in U.S. Pat. No. 5,368,304, the disclosure of which is incorporated herein in its entirety by reference. The plastomer cover layer or layers are then formed over the core using a conventional molding technique, such as compression molding or injection molding. The golf ball is finished by applying an indicia and a thin top coat with or without the use of a primer coat.

The plastomer and ionomer typically are subject to intensive mixing such as in a Banbury mixer, two roll mill, or the like. When the plastomer cover is made by compression molding, the golf ball center is placed between two half-shells and the ball is molded for about 1–3 minutes at 200–300° F. and 100 p.s.i. Subsequently, the molded ball is cooled for about 10 minutes. When the plastomer cover is made by injection molding, the cover material is heated to 300–400° F. and injection molded into a cold mold where it is maintained for about 20–60 seconds.

Coefficient of restitution (COR) is measured by firing a golf ball from an air cannon at about 125 feet per second against a steel plate positioned 12 feet from the muzzle of the cannon. The rebound velocity then is measured. The rebound velocity is divided by the initial velocity of 125 feet per second to give the COR.

Riehle compression is a measurement of the deformation of a golf ball in inches under a load. Riehle compression can be converted to PGA compression by subtracting Riehle compression values from 160.

The "Guillotine Cut Test" employed to measure cut resistance is performed by holding an unfinished ball firmly in a cavity to expose the top half of the ball. A guillotine blade weighing 5 pounds and having inner and outer blade edge angles of 90° and 60° relative to the horizontal, respectively, and a blunt cutting edge of three sixty-fourths inch radius which is designed to simulate the leading edge of an iron is dropped from a height of three feet to strike the ball at a point one-half inch off the top center point. The guillotine blade is guided during the drop by means of a substantially friction-free vertical track. Optionally, but not necessarily, the test can be repeated on the same or on different sections of the ball. Ball failure is defined as permanent damage evidenced by a crack or by removal of a segment from the ball surface. A rating of 1 is excellent and a rating of 4 is poor. The cut-off for a commercially acceptable ball is a rating of 3.

Having generally described the invention, the following examples are included for purposes of illustration so that the invention may be more readily understood and are in no way intended to limit the scope of the invention unless otherwise specifically indicated. In the examples, Shore C and Shore D hardness values generally were measured in accordance with ASTM D-2240, except that measurements were made on the curved surface of a golf ball.

EXAMPLES

A number of golf ball cores were formed primarily from polybutadiene, zinc diacrylate, and free radical initiator having a weight of 36.8 grams, a Riehle compression of 81 (PGA compression of 79), and a coefficient of restitution (COR) of 0.786. The cores had a diameter of 1.55 inches. About 12 of the cores were covered with each of the cover formulation shown below on Table 1. One set of controls was covered with the 1995 Top Flite Z balata cover formulation. The remaining cores were covered with one of four different cover formulations comprising an ionomer-plastomer blend. The covers had a thickness of 0.067 inches. Properties of the molded balls were measured, and are also shown on Table 1 below. All of the cover formulations were mixed in an internal Banbury®-type mixer at an elevated temperature.

As shown on Table 1, Example 3 had a coefficient of restitution 10 points higher than control Example C-1 with a Shore D hardness comparable to that of control Example C-1.

As will be apparent to persons skilled in the art, various modifications and adaptations of the composition and structure above described will become readily apparent without departure from the spirit and scope of the invention.

TABLE 1

Golf Balls With Covers Formed From Blends of Ionomer and Plastomer

| Material (pbw) | C1 | C2 | 1 | 2 | 3 | 4 |
|---|---|---|---|---|---|---|
| 1995 Z-Balata | X | — | — | — | — | — |
| Iotek 8000 | — | 600 | 560 | 560 | 560 | — |
| Iotek 7030 | — | 448 | 408 | 408 | 408 | — |
| Iotek 3110 | — | — | — | — | — | 1120 |
| GLS 6703 | — | 400 | 240 | — | — | — |
| EXACT 4049 | — | — | 240 | 240 | 480 | 160 |
| Kraton FG 1901 X | — | — | — | 240 | — | 160 |
| Masterbatch | — | 152 | 152 | 152 | 152 | 152 |
| Weight (g) | 45.2 | 45.1 | 44.9 | 45.1 | 44.9 | 45.0 |
| Comp (Riehle) | 84 | 81 | 80 | 78 | 78 | 79 |
| Comp (PGA) | 76 | 79 | 80 | 82 | 82 | 81 |
| COR | .791 | .795 | .796 | .800 | .801 | .793 |
| Shore D (ASTM D-2240) | 55 | 53 | 53 | 58 | 55–56 | 57 |
| Shore C (ASTM D-2240) | | 86 | 85 | 89 | | 87 |
| Guillotine Cut Test | 1.5 | 1.5 | 1.5 | 1.5 | 1.5 | 1.5 |

We claim:

1. A golf ball comprising
a core; and
a cover layer disposed about the core, the cover layer comprising an ionomer, a plastomer, and a thermoplastic elastomer, the plastomer having a dispersion index of 1.5 to 5 and including a copolymer of ethylene and at least one olefin comonomer, the comonomer constituting from 10% to 35% of the weight of the plastomer, the ionomer being an ethylene acrylic acid copolymer.

2. The golf ball of claim 1 wherein the ionomer is a sodium salt.

3. The golf ball of claim 1 wherein the ionomer is a zinc salt.

4. A golf ball having a core and a cover layer, the cover layer being formed from a blend comprising ionomer, plastomer and thermoplastic elastomer, the plastomer having a dispersion index of about 1.5 to 5 and comprising a copolymer of ethylene and at least one olefin comonomer, the comonomer being present in an amount of 10–35 wt % based upon the overall weight of the plastomer, wherein the golf ball exhibits a PGA compression of from about 80 to about 90.

5. The golf ball according to claim 4, wherein the plastomer is present in an amount of at least 10 parts by weight based upon 100 parts by weight of the blend.

6. The golf ball according to claim 4, wherein the plastomer is present in an amount of 20–60 parts by weight based upon 100 parts by weight of the blend.

7. The golf ball according to claim 4, wherein the plastomer's dispersion index is within the range of 1.5–2.4.

8. The golf ball according to claim 4, wherein the olefin comonomer is selected from the group consisting of propylene, 1-butene, 1-hexene, 1-octene, 4-methyl pentene-1, 1, 4-hexadiene, norbornene, norbornadiene, vinyl norbornene, ethylidene norbornene, etc.

9. The golf ball according to claim 4, wherein the plastomer has a melt index of less than 30.

10. The golf ball according to claim 9 wherein the melt index is less than 5.

11. A golf ball according to claim 4, wherein the cover comprises a blend of about 10–30 parts by weight of plastomer and 100 parts by weight of an ionomer.

12. A golf ball according to claim 4, wherein said ball has a cut resistance of at least 3.0.

13. A golf ball according to claim 4, wherein said ionomer is ethylene acrylic acid copolymer.

14. A golf ball according to claim 13, wherein said ionomer is neutralized with zinc cation.

15. A golf ball according to claim 13, wherein said ionomer is neutralized with sodium cation.

16. A method of making a golf ball comprising the steps of:
obtaining a golf ball core, and
forming a cover over the core, the cover comprising a blend of ionomer, plastomer and thermoplastic elastomer, the plastomer having a dispersion index of about 1.5 to 5 and comprising a copolymer of ethylene and at least one olefin comonomer, the comonomer being present in an amount of 10–35 wt % based upon the overall weight of the plastomer, wherein the properties of the core and cover and the steps of their making are selected such that the golf ball exhibits a PGA compression of from about 80 to about 90.

17. The method according to claim 16, wherein the plastomer is present in an amount of at least 10 parts by weight based upon 100 parts by weight of the blend.

18. The method according to claim 16, wherein the plastomer is present in an amount of 20–60 parts by weight based upon 100 parts by weight of the blend.

19. The method of claim 16 wherein the dispersion index is within the range of 1.5–2.4.

20. The method according to claim 16, wherein the olefin comonomer is at least one member selected from the group consisting of propylene, 1-butene, 1-hexene, 1-octene, 4-methyl pentene-1,1,4-hexadiene, norbornene, norbornadiene, vinyl norbornene, ethylidene norbornene, etc.

21. The method of claim 16 wherein the plastomer has a melt index of less than 30.

22. The method according to claim 16, wherein the cover comprises a blend of about 10–30 parts by weight of plastomer and 100 parts by weight of an ionomer.

23. The method according to claim 16 wherein said ionomer is ethylene acrylic acid copolymer.

24. The method according to claim 23 wherein said ionomer is neutralized with at least one of zinc and sodium cations.

* * * * *